US009268951B2

(12) United States Patent
Oppermann et al.

(10) Patent No.: US 9,268,951 B2
(45) Date of Patent: Feb. 23, 2016

(54) METHOD AND SYSTEM FOR ENABLING A TECHNICAL APPARATUS

(71) Applicant: AUDI AG, Ingolstadt (DE)

(72) Inventors: Nils Oppermann, Ingolstadt (DE); Tobias Gansen, Pietenfeld (DE); Peter Lacher, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 36 days.

(21) Appl. No.: 14/356,684

(22) PCT Filed: Oct. 19, 2012

(86) PCT No.: PCT/EP2012/004391
§ 371 (c)(1),
(2) Date: May 7, 2014

(87) PCT Pub. No.: WO2013/068074
PCT Pub. Date: May 16, 2013

(65) Prior Publication Data
US 2014/0298023 A1    Oct. 2, 2014

(30) Foreign Application Priority Data

Nov. 11, 2011  (DE) .......................... 10 2011 118 234

(51) Int. Cl.
*H04L 29/06*    (2006.01)
*G06F 21/60*    (2013.01)
(Continued)

(52) U.S. Cl.
CPC ................ *G06F 21/60* (2013.01); *G07C 5/008* (2013.01); *H04W 4/008* (2013.01); *H04W 12/04* (2013.01); *H04W 12/06* (2013.01)

(58) Field of Classification Search
CPC .......... G06F 21/60; G06F 21/602; G07C 5/00; G07C 5/008; H04W 4/046; H04W 12/04; H04W 12/06; H04W 4/008; G06Q 50/30; G06Q 50/02
USPC ....................................................... 713/168
See application file for complete search history.

(56) References Cited

U.S. PATENT DOCUMENTS

2009/0183541 A1 *  7/2009  Sadighi et al. ................... 70/263
2009/0251279 A1 * 10/2009  Spangenberg et al. ........ 340/5.7
(Continued)

FOREIGN PATENT DOCUMENTS

| DE | 10142967 | 3/2003 |
|----|----------|--------|
| DE | 10237831 | 2/2004 |

(Continued)

OTHER PUBLICATIONS

WIPO English language translation of International Preliminary Report on Patentability mailed on Jun. 12, 2014 for corresponding International Patent Application No. PCT/EP2012/004391.
(Continued)

*Primary Examiner* — Yogesh Paliwal
(74) *Attorney, Agent, or Firm* — Staas & Halsey LLP

(57) ABSTRACT

A method and a system transmit data between a technical apparatus which has a reception unit, a transmission unit and a computer unit, an external device which has a reception unit, a transmission unit and a computer unit, and a mobile terminal which has a reception unit, a transmission unit and a memory unit. The method and system allow registered, authenticated users to use the mobile terminal to perform safe reservation or enabling for a technical apparatus, without requiring an online connection and check between the technical apparatus and the external device for the purpose of authorization and authentication of the user.

17 Claims, 1 Drawing Sheet

(51) Int. Cl.
  *H04W 12/04* (2009.01)
  *H04W 12/06* (2009.01)
  *G07C 5/00* (2006.01)
  *H04W 4/00* (2009.01)

(56) References Cited

U.S. PATENT DOCUMENTS

| | | | |
|---|---|---|---|
| 2010/0222940 A1 | 9/2010 | Pütsch | |
| 2011/0112969 A1* | 5/2011 | Zaid et al. | 705/50 |
| 2012/0129493 A1* | 5/2012 | Vasudevan | 455/411 |

FOREIGN PATENT DOCUMENTS

| | | |
|---|---|---|
| DE | 102007048696 | 4/2009 |
| DE | 102011118234.2 | 11/2011 |
| EP | 0913979 | 5/1999 |
| EP | 2199503 | 6/2010 |
| GB | 2373614 | 9/2002 |
| JP | 2011-39712 | 2/2011 |
| WO | 2007/009453 | 1/2007 |
| WO | 2011/053357 | 5/2011 |
| WO | PCT/EP2012/004391 | 10/2012 |

OTHER PUBLICATIONS

German Office Action for German Priority Patent Application No. 10 2011 118 234.2, issued Jul. 9, 2012, 8 pages.

English Language International Search Report for PCT/EP2012/004391, mailed Feb. 22, 2013, 2 pages.

Chinese Office Action dated Aug. 3, 2015 from Chinese Patent Application No. 201280055333.3, 11 pages.

* cited by examiner

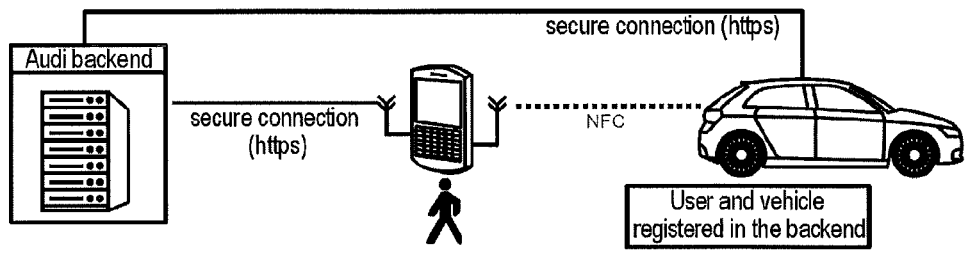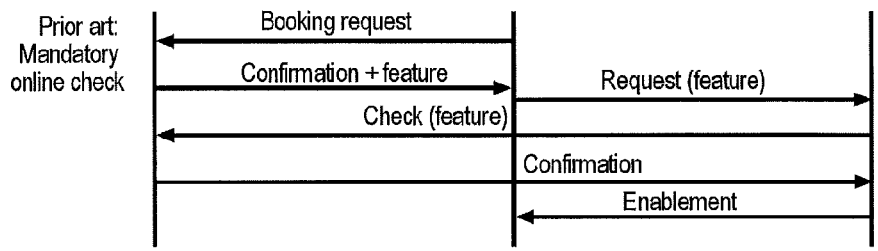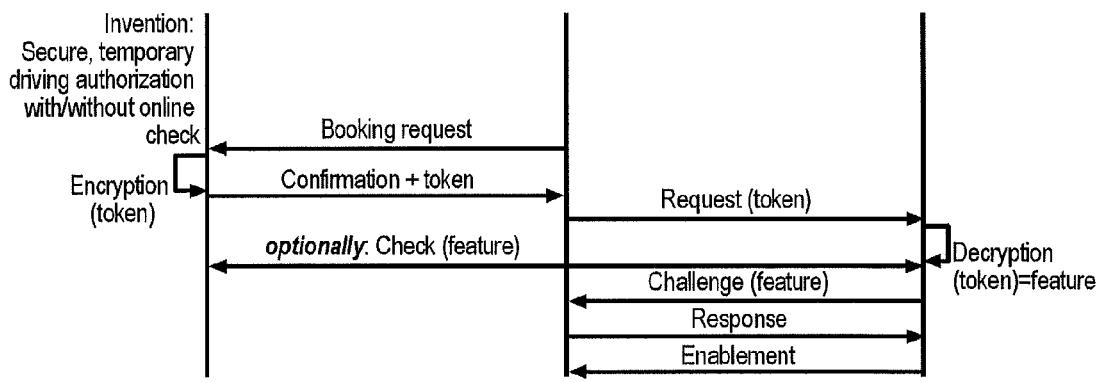

METHOD AND SYSTEM FOR ENABLING A TECHNICAL APPARATUS

CROSS REFERENCE TO RELATED APPLICATIONS

This application is based on and hereby claims priority to International Application No. PCT/EP2012/004391 filed on Oct. 19, 2012 and German Application No. 10 2011 118 234.2 filed on Nov. 11, 2011, the contents of which are hereby incorporated by reference.

BACKGROUND

The invention relates to a method and system for enabling a technical apparatus.

It is known that, other than the previously exclusively customary conventional keys, different methods can be used as for identification to prove the authorization to use and/or access technical apparatus.

Today, magnetic cards, chip cards, smartcards and/or mobile devices can thus also perform the function of a "key", by which a user can gain access to a technical apparatus and/or can use a technical apparatus, wherein these new identification techniques can be used either cumulatively, alternatively, or instead of the previously customary keys. A "key" in the form of a data record is stored on magnetic cards, chip cards, smartcards and/or mobile devices of this type, which, for example, is transmitted to a receiving unit in a technical apparatus and is evaluated there. If the evaluation reveals that a permitted and valid key has been transmitted, access to and/or use of the technical apparatus is enabled for a user.

New identification techniques of this type are described, for example, in EP 0 913 979 A2 and DE 101 42 967 A1.

According to the current related art, it is similarly possible for a secure connection, for example, an Internet connection, to be set up between a technical apparatus, such as, for example, a (motor) vehicle and an external computer unit. It is possible, for example, to check the authenticity of access and/or usage authorizations of one or more users via a secure connection of this type and, where appropriate, to grant or refuse access and/or usage authorizations.

Examples of such or similar solutions are described in DE 102 37 831 A1 and WO 20071009453A2.

WO 2007/009453 A2 thus describes an identifying and/or locking system for identifying and/or unblocking a technical system comprising at least one controlling receiver unit which executes at least one control function in accordance with a received signal, said technical system further comprising a mobile transmitter unit suitable for transmitting a signal that causes the controlling receiver unit to execute the control function. The controlling receiver unit tests whether a received signal is to trigger execution of a control function while the mobile transmitter unit allows the signal that is to be transmitted to the controlling receiver unit to be defined, modified, and stored. Such a system makes it possible especially to digitally transmit and temporally limit keys.

And from WO 2011/053357 A1, an access control for a vehicle is known in which a vehicle reservation from a wireless communication device is received, the vehicle reservation is authenticated, and access to the vehicle is provided after authenticating the vehicle reservation. The system for vehicle access control includes a vehicle access control component that is configured to provide access to a vehicle and a communication interface for communication with a wireless communication device. Access to the vehicle is provided when a vehicle reservation is received from the wireless communication device.

In some of the hitherto known solutions, when a "new key" of this type is used, a user forgoes a check on the validity of the key used and/or a check with a view to authenticating and authorizing the user using the key, but this is unacceptable in many cases from a security point of view.

In solutions according to the related art which propose a check of this kind, either insufficient secure technical solutions and/or methods are used, or a check can only take place as soon as and as long as a connection exists from the technical apparatus to an external checking device. If the technical apparatus has no connection to the external checking device in such a case, no check on the validity of the authorization can be carried out either, and the technical apparatus cannot e.g. be used by an authorized user.

However, in the solutions known from the related art, an online check cannot simply be foregone, since the security of the authorization would not be adequate. If a "new key" is stored on mobile terminals, such as cellphones, Smartphones and PDAs, additional security problems arise due to the fundamentally inherent manipulability of these terminals.

However, a secure and reliable management of new keys of this type for a technical apparatus is required, particularly in cases where keys that are valid for a limited period of time or reservations for their access and/or use are to be repeatedly generated, as is the case, for example, with fleet vehicles of companies, the vehicle fleet of car-sharing companies or automobile leasing companies.

SUMMARY

One possible object is therefore to provide a method and a system with which the disadvantages of the related art are overcome.

The inventors propose a method for data transmission between a technical apparatus having a receiving unit, a transmitting unit and a computer unit, an external device having a receiving unit, a transmitting unit and a computer unit, and a mobile terminal having a receiving unit, a transmitting unit and a storage unit, wherein the method comprises:

(a) Transmission of a reservation request of a user by the transmitting unit of the mobile terminal to the receiving unit of the external device and forwarding of the reservation request to the computer unit of the external device;

(b) Checking of the reservation request by the computer unit of the external device in relation to authentication and authorization of the user and availability of the technical apparatus;

(c) Generation of a data record by the computer unit of the external device, wherein the data record contains reservation information and information to authenticate and authorize the user, and encryption of the data record with an apparatus-specific password by the computer unit of the external device in such a way that the encrypted data record cannot be read and/or decrypted by the mobile terminal;

(d) Forwarding of the encrypted data record to the transmitting unit of the external device, transmission of the encrypted data record by the transmitting unit of the external computer unit to the receiving unit of the mobile terminal and storage of the encrypted data record in the storage unit of the mobile terminal;

(e) Transmission of the encrypted data record by the user by the transmitting unit of the mobile terminal to the receiving unit of the technical apparatus, forwarding of the encrypted data record to the computer unit of the technical apparatus;

(f-1) Decryption and evaluation of the data record by the computer unit of the technical apparatus;

(g) Generation of an authentication request by the computer unit of the technical apparatus, forwarding of the authentication request to the transmitting unit of the technical apparatus and transmission of the authentication request by the transmitting unit of the technical apparatus to the receiving unit of the mobile terminal;

(h) Transmission of an authentication response by the user to the receiving unit of the technical apparatus, forwarding to and evaluation of the authentication response by the computer unit of the technical apparatus;

(i) Enablement of the technical apparatus by the computer unit of the technical apparatus.

By the proposed method, registered, authenticated users can make a reservation for a technical apparatus, for example, a vehicle, via a mobile terminal. To do this, the user can use, for example, an input unit (buttons, touch-sensitive screen, voice control) which the mobile terminal has. Provided that the technical apparatus is available for the required time period and the required authorization and authenticity of the user have been established through a check of the user data, the computer unit of the external device generates a reservation confirmation together with data containing information for authentication and authorization of the user, and encrypts this preferably digital data record with an apparatus-specific password. This encrypted data record is also occasionally referred to below as a reservation token. The user receives this encrypted data record transmitted to his mobile terminal.

The encrypted data record contains all information for the reservation, e.g. reservation time period, and also the information necessary for authentication and authorization of the user (e.g. a Personal Identification Number (PIN)).

The mobile terminal can transmit the encrypted data record to the technical apparatus, but cannot itself read and/or decrypt this encrypted data record. This results in the first advantage that no security concerns arise in relation to a possible manipulability of the mobile terminal.

A further security-related advantage results from the fact that the data record is encrypted with an apparatus-specific password. This data record can therefore be decrypted and evaluated only by the associated technical apparatus.

Another further advantage results from the fact that the encrypted data record contains information for authentication and authorization of the user, i.e. the technical apparatus receives all required information relating to a correct authentication response. Following a corresponding authentication request by the technical apparatus, the user must authenticate himself in relation to the technical apparatus with a unique feature in order to achieve an enablement of the technical apparatus. An authentication response of this type may, for example, include a unique feature, such as, for example, a PIN.

Due to the circumstance that the encrypted data record contains information for authentication and authorization of the user, an authentication of the user is possible without the need for an online connection from the technical apparatus to the external device.

A further advantage results from the fact that the encrypted data record has information relating to a time-dependent validity of the reservation. The user can therefore use the technical apparatus and/or has access to it only within a valid time window. Furthermore, the encrypted data record may contain information relating to the scope of the granted use, for example, how many kilometers the user can drive with the vehicle within the valid time window.

According to an advantageous further development, the proposed method also includes:

(f-2) Generation of a validation request by the computer unit of the technical apparatus, forwarding of the validation request to the transmitting unit of the technical apparatus, transmission of the validation request by the transmitting unit of the technical apparatus to the receiving unit of the external device, forwarding to and evaluation of the validation request by the computer unit of the external device;

(f-3) Generation of a validation response by the computer unit of the external device, forwarding of the validation response to the transmitting unit of the external device, transmission of the validation response by the transmitting unit of the external device to the receiving unit of the technical apparatus, forwarding to and evaluation of the validation response by the computer unit of the technical apparatus.

As already mentioned above, one advantage of the method is that no connection is required between the technical apparatus and the external device for authorization and authentication of a user in relation to the technical apparatus. However, if a connection exists or can be set up between the technical apparatus and the external device, a connection of this type can advantageously be used to send a validation request to the external device and transmit a validation response by the device to the technical apparatus, in order to further increase the security of the technical apparatus.

According to another further development, the mobile terminal used in the method may be a mobile radio device, in particular a mobile telephone, PDA (Personal Digital Assistant), a SmartPhone or a similar mobile device. The overwhelming majority of the population now possesses a device of this type. Devices of this type also have a receiving unit, a transmitting unit and a storage unit. If necessary, a corresponding application must be installed on the mobile terminal for the method, so that said terminal is usable for the method. An application of this type may, for example, be a JAVA application or an application specific to the application (e.g. for Android, Symbian, Bada, Windows Mobile). Mobile terminals of this type normally have an input unit (keypad, touch-sensitive screen, voice control) also, which is often useful for the method.

The transmission of the reservation request from the transmitting unit of the mobile terminal to the receiving unit of the external device, the transmission of the encrypted data record from the transmitting unit of the external device to the receiving unit of the mobile terminal, the transmission of the validation request by the transmitting unit of the technical apparatus to the receiving unit of the external device, and/or the transmission of the validation response by the transmitting unit of the external device to the receiving unit of the technical apparatus are preferably carried out by a radio connection, in particular a wireless long-distance or a WLAN connection.

For example, a digital mobile radio connection according to the GSM standard or one of the subsequently added extensions for a faster data transmission can be used in a wireless long-distance connection.

However, it is also possible to carry out the aforementioned transmissions in a wire-connected manner. Thus, for example, the mobile terminal and/or the technical apparatus can be connected directly or indirectly to the external device by a wire-connected data connection (e.g. USB cable, LAN cable) or a plug-in connection.

According to another further development, the transmission of the reservation request from the transmitting unit of the mobile terminal to the receiving unit of the external device, the transmission of the encrypted data record from the transmitting unit of the external device to the receiving unit of the mobile terminal, the transmission of the validation request by the transmitting unit of the technical apparatus to the receiving unit of the external device, and/or the transmission of the validation response by the transmitting unit of the external device to the receiving unit of the technical apparatus are carried out using a network protocol, in particular an Internet protocol.

The overwhelming majority of the currently used mobile telephones, PDAs, SmartPhones or similar mobile devices can set up a connection to the Internet. The same already applies to many technical apparatuses, such as e.g. modern automobiles. The method can therefore also be advantageously carried out using the Internet or at least using an Internet protocol. The method can also be carried out using a different suitable network standard and/or a different suitable network architecture.

According to another further development, it is provided that the transmission of the encrypted data record from the transmitting unit of the mobile terminal to the receiving unit of the technical apparatus, the transmission of the authentication request from the transmitting unit of the technical apparatus to the receiving unit of the mobile terminal and/or the transmission of the authentication response by the transmitting unit of the mobile terminal to the receiving unit of the technical apparatus are carried out by a radio connection, via ultrasound or an infrared connection.

This further development enables a convenient transmission for the user between his mobile terminal and the technical apparatus, since, for example, no wire-connected connection or a connection by a plug-in connection is required. Bluetooth or Near Field Communication, for example, can be used as the radio connection technology. The aforementioned transmissions can also be carried out in a wire-connected manner, by a plug-in connection or in some other manner. For example, it is possible for the authentication request and authentication response to be carried out by a reading device and an identification card. The required data can be stored on the identification card e.g. by a chip, a magnetic strip or in an opto-electronically readable, coded form, and these are read by the reading device and are then evaluated in a suitable manner.

In order to maintain the highest possible security standard, at least one of the transmission processes should be carried out in an encrypted manner, even more preferably all of the transmission processes, should be carried out in an encrypted manner. As a result, particularly in the case of wireless transmission paths, third parties are prevented from simply reading the information contained in unencrypted data.

To increase the security of the method, it can furthermore be provided that only one data record containing reservation information and information to authenticate and authorize the user is stored in each case in the storage unit of the technical apparatus. It is thereby ensured that only one user in each case has access to and/or can use the technical apparatus. If a new data record is stored in the storage unit of the technical apparatus, the previous data record automatically loses its validity.

This further development can also be used, for example, to overwrite an existing access and usage authorization (e.g. in the event of early expiry of the authorization of the user), and thereby invalidate it. This overwriting can be performed, for example, using a mobile terminal or the external device.

According to a further development, data relating to the status of components of the technical apparatus, the location of the technical apparatus and/or billing-related data can also be received and/or transmitted via the receiving unit, the transmitting unit, the computer unit and the storage unit of the technical apparatus, and the receiving unit, transmitting unit and computer unit of the external device.

This results in an advantageous further development of the method in that a further increased security is achieved and/or further services can be offered.

The inventors also propose a system comprising a technical apparatus having a receiving unit, a transmitting unit and a computer unit and an external device having a receiving unit, a transmitting unit and a computer unit, and a mobile device having a receiving unit, a transmitting unit and a storage unit, wherein the system carries out the method comprising:

(a) Transmission of a reservation request of a user by the transmitting unit of the mobile terminal to the receiving unit of the external device and forwarding of the reservation request to the computer unit of the external device;

(b) Checking of the reservation request by the computer unit of the external device in relation to authentication and authorization of the user and availability of the technical apparatus;

(c) Generation of a data record by the computer unit of the external device, wherein the data record contains reservation information and information to authenticate and authorize the user, and encryption of the data record with an apparatus-specific password by the computer unit of the external device in such a way that the encrypted data record cannot be read and/or decrypted by the mobile terminal;

(d) Forwarding of the encrypted data record to the transmitting unit of the external device, transmission of the encrypted data record by the transmitting unit of the external computer unit to the receiving unit of the mobile terminal and storage of the encrypted data record in the storage unit of the mobile terminal;

(e) Transmission of the encrypted data record by the user by the transmitting unit of the mobile terminal to the receiving unit of the technical apparatus, forwarding of the encrypted data record to the computer unit of the technical apparatus;

(f-1) Decryption and evaluation of the data record by the computer unit of the technical apparatus;

(g) Generation of an authentication request by the computer unit of the technical apparatus, forwarding of the authentication request to the transmitting unit of the technical apparatus and transmission of the authentication request by the transmitting unit of the technical apparatus to the receiving unit of the mobile terminal;

(h) Transmission of an authentication response by the user to the receiving unit of the technical apparatus, forwarding to and evaluation of the authentication response by the computer unit of the technical apparatus;

(i) Enablement of the technical apparatus by the computer unit of the technical apparatus.

The system may perform and of the methods variants described above.

The "technical apparatus" may be any device suitable for the method. The method and system are suitable, for example, for a vehicle, preferably a fleet vehicle, as used in vehicle fleets of companies, car-sharing companies or automobile leasing. In vehicles of this type, a quickly changing reservation is carried out by different users, so that the method and system can be used particularly advantageously here.

However, the "technical apparatus" within the meaning of this document is not limited to vehicles. For example, a "technical apparatus" within the meaning may also be a hotel room or a guest house, wherein limited-time access to the hotel room or guest house is enabled for a user by the method and system. A further example of a "technical apparatus" within the meaning of this document is a stationarily installed or mobile machine.

When the technical apparatus is enabled by the computer unit of the technical apparatus, it may be necessary for a control device to be activated (e.g. unlocking or locking of doors, an enablement or locking of the ignition, an enablement or locking of a steering wheel lock, an enablement or locking of a vehicle immobilizer and/or an enablement or locking of an engine control device). In this case, the technical apparatus contains the necessary control device(s).

When a technical apparatus is enabled for use by a user, a use of the technical apparatus, if necessary limited in time, place and scope, is enabled for the user. A user may, for example, use an enabled vehicle within a valid time window, or has access to a hotel room for a defined time period.

In order to improve security, it may furthermore be provided that at least one of the transmissions is set up bidirectionally and/or that the data of the reservation request by the mobile terminal contain a code which can be used to authenticate the mobile terminal.

BRIEF DESCRIPTION OF THE DRAWING

These and other objects and advantages of the present invention will become more apparent and more readily appreciated from the following description of the preferred embodiments, taken in conjunction with the accompanying drawing of which:

The single FIGURE shows a schematic representation of a method according to the related art and a method for granting a secure temporary driving authorization for a vehicle with and without online checking.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

In the upper area of the FIGURE, an external device, designated as "Audi backend", is shown on the left. A backend of this type contains at least a computer unit, a receiving unit and a transmitting unit. In order to manage different technical apparatuses and to manage different temporary driving authorizations, the backend preferably also contains a storage device or has write and read access to a storage device of this type.

In the example shown, a suitable application, with which at least the communication with the backend is enabled, is stored on the mobile terminal. If necessary, this application or a further application on the mobile terminal enables the communication with the vehicle.

Both the user and the vehicle are registered in the backend.

In the exemplary embodiment shown, the vehicle and the mobile terminal have a receiving and transmitting device according to the NFC standard.

In the method according to the related art ("Mandatory online check"), the user transmits a booking request to the backend ("Booking request") by the mobile terminal. If the vehicle is available and the user is identified as a registered user, the backend transmits a booking confirmation to the mobile terminal ("Confirmation+feature").

Using the mobile terminal, the user then transmits the booking confirmation to the vehicle by NFC, together with an identification feature unique to him ("Request (feature)"). The vehicle then transmits a request to the backend to check the unique identification feature ("Check (feature)").

If the unique identification feature matches the stored feature, the backend transfers a confirmation of the request to the vehicle ("Confirmation"). The latter then transmits the enablement notification to the mobile terminal and enables the vehicle for use ("Enablement").

In this method according to the related art, an online check of the identification feature of the user is therefore always a mandatory requirement. No enablement can take place without a connection between the backend and the vehicle.

In a method ("Secure temporary driving authorization with/without online check"), first the user transmits a booking request to the backend ("Request booking"), similarly by the mobile terminal. If the vehicle is available and the user is identified as a registered user, the backend generates an encrypted booking confirmation (Reservation token) and transmits it to the mobile terminal ("Encryption (token)" and "Confirmation+token").

In the exemplary embodiment shown, the user transmits this booking confirmation to the vehicle using the mobile terminal by NFC ("Request (token)"). The vehicle decrypts the booking confirmation and the reservation token ("Encryption (token)=feature") and transmits a request to the mobile terminal to enter a unique identification feature ("Challenge (feature)").

The request is signaled to the user on the mobile terminal, where appropriate following a necessary evaluation by the mobile terminal (e.g. by an application and a computer unit of the mobile terminal). The user then transmits a unique identification feature to the vehicle ("Response"). If the unique identification feature matches the feature stored in the reservation token, the vehicle is enabled for use and, where appropriate, an enablement notification is transmitted to the mobile terminal and signaled there ("Enablement").

Only optionally, a validation request can be transmitted by the vehicle to the backend to check the unique identification feature stored in the reservation token and a confirmation can be transmitted from there to the vehicle ("optionally: Check (feature)").

In the method and system, an online check is therefore not a mandatory requirement and a check of the authorization and authentication of the user and an enablement of the vehicle can be carried out even if the vehicle cannot set up a connection to the backend. With the method and system, a secure, temporary vehicle key for e.g. a fleet vehicle can be generated and used with and without online checking.

A plurality of important criteria of the method and system are summarized once more below:

Registered, authenticated users can make a reservation for a technical apparatus (e.g. vehicle) e.g. via an application on their mobile terminal (e.g. mobile radio device);

When a technical apparatus (e.g. vehicle) is reserved, for example by the application, the backend generates a reservation token and encrypts it with an apparatus-specific password;

The user receives the encrypted reservation token transmitted onto his mobile terminal. The latter cannot read the reservation token, but can transmit it later to the technical apparatus (e.g. via NFC);

The technical apparatus can decrypt and evaluate the reservation token with the apparatus-specific password;

The reservation token contains all necessary information for the reservation (e.g. reservation period) and for the authentication and authorization of the user (e.g. PIN);

The user must authenticate himself in relation to the technical apparatus with a unique feature (e.g. PIN) from the reservation token before accessing and/or using the technical apparatus.

The method and system therefore offer in particular the following advantages in comparison with the related art:

A mobile terminal, such as a cellphone, Smartphone and PDA, can be used from a user perspective as a temporary key;

Since the mobile terminal has no access to the reservation token, the mobile terminal, as a potentially insecure platform, poses no risk to system security;

Only the associated technical apparatus can decrypt the reservation token;

Due to the user-related information which is transmitted in encrypted form in the reservation token, the technical apparatus can authenticate the authorized user even without an online check;

The handling of users, technical apparatuses and reservations runs centrally in the external device (backend);

Optionally, only one reservation token can be stored in the technical apparatus, so that a subsequent reservation overwrites and therefore invalidates the old reservation token;

Optionally, a connection between the technical apparatus and the external device (backend) can be used to increase security and offer further services (e.g. cost billing, monitoring).

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for data transmission between a technical apparatus having a receiving unit, a transmitting unit and a computer unit, a backend having a receiving unit, a transmitting unit and a computer unit, and a mobile terminal having a receiving unit, a transmitting unit and a storage unit, comprising:

transmitting a reservation request of a user by the transmitting unit of the mobile terminal to the receiving unit of the backend and forwarding of the reservation request to the computer unit of the backend;

checking the reservation request by the computer unit of the backend in relation to authentication and authorization of the user and availability of the technical apparatus;

generating a data record by the computer unit of the backend, the data record containing reservation information and a unique identification feature including information relating to authentication and authorization of the user;

encrypting the data record by the computer unit of the backend to produce an encrypted data record, the data record being encrypted with an apparatus-specific password in such a way that the encrypted data record cannot be read and/or decrypted by the mobile terminal;

forwarding the encrypted data record to the transmitting unit of the backend, transmitting the encrypted data record by the transmitting unit of the backend to the receiving unit of the mobile terminal and storing the encrypted data record in the storage unit of the mobile terminal;

transmitting the encrypted data record by the user from the transmitting unit of the mobile terminal to the receiving unit of the technical apparatus, forwarding of the encrypted data record to the computer unit of the technical apparatus;

decrypting and then evaluating the encrypted data record by the computer unit of the technical apparatus;

generating an authentication request by the computer unit of the technical apparatus, forwarding the authentication request to the transmitting unit of the technical apparatus and transmitting the authentication request by the transmitting unit of the technical apparatus to the receiving unit of the mobile terminal;

transmitting an authentication response by the user to the receiving unit of the technical apparatus, forwarding the authentication response to, and evaluating the authentication response by the computer unit of the technical apparatus; and enabling the technical apparatus by the computer unit of the technical apparatus, wherein after decrypting and evaluating the encrypted data record by the computer unit of the technical apparatus, a checking process is performed, the checking process comprising:

generating by the computer unit of the technical apparatus, a validation request to check the unique identification feature contained in the data record, forwarding the validation request to the transmitting unit of the technical apparatus;

transmitting the validation request by the transmitting unit of the technical apparatus to the receiving unit of the backend, forwarding the validation request to, and evaluating the validation request by the computer unit of the backend; and generating a validation response by the computer unit of the backend, forwarding the validation response to the transmitting unit of the backend, transmitting the validation response by the transmitting unit of the backend to the receiving unit of the technical apparatus, forwarding the validation response to, and evaluating the validation response by the computer unit of the technical apparatus.

2. The method as claimed in claim 1, wherein the mobile terminal is a mobile radio device selected from the group consisting of a mobile telephone, a Personal Digital Assistant (PDA), and a SmartPhone.

3. The method as claimed in claim 1, wherein a wireless long-distance radio connection or a wireless local area network (WLAN) radio connection is used for at least one transmission selected from the group consisting of transmission of the reservation request from the transmitting unit of the mobile terminal to the receiving unit of the backend, transmission of the encrypted data record from the transmitting unit of the backend to the receiving unit of the mobile terminal, transmission of the validation request by the transmitting unit of the technical apparatus to the receiving unit of the backend, and transmission of the validation response by the transmitting unit of the backend to the receiving unit of the technical apparatus.

4. The method as claimed in claim 1, wherein an internet and an internet protocol are used for at least one transmission selected from the group consisting of transmission of the reservation request from the transmitting unit of the mobile terminal to the receiving unit of the backend, transmission of the encrypted data record from the transmitting unit of the backend to the receiving unit of the mobile terminal, transmission of the validation request by the transmitting unit of the technical apparatus to the receiving unit of the backend, and transmission of the validation response by the transmitting unit of the backend to the receiving unit of the technical apparatus.

5. The method as claimed in claim 1, wherein an ultrasound connection or an infrared connection is used for at least one transmission selected from the group consisting of transmission of the encrypted data record from the transmitting unit of the mobile terminal to the receiving unit of the technical apparatus, transmission of the authentication request from the transmitting unit of the technical apparatus to the receiving unit of the mobile terminal and transmission of the authentication response by the transmitting unit of the mobile terminal to the receiving unit of the technical apparatus.

6. The method as claimed in claim 5, wherein Bluetooth or Near Field Communication is used for at least one transmission selected from the group consisting of transmission of the encrypted data record from the transmitting unit of the mobile terminal to the receiving unit of the technical apparatus, transmission of the authentication request from the transmitting unit of the technical apparatus to the receiving unit of the mobile terminal and transmission of the authentication response by the transmitting unit of the mobile terminal to the receiving unit of the technical apparatus.

7. The method as claimed in claim 1, wherein encrypted communication is used for at least one transmission selected from the group consisting of transmission of the reservation request from the transmitting unit of the mobile terminal to the receiving unit of the backend, transmission of the validation request by the transmitting unit of the technical apparatus to the receiving unit of the backend, transmission of the validation response by the transmitting unit of the backend to the receiving unit of the technical apparatus, transmission of the authentication request from the transmitting unit of the technical apparatus to the receiving unit of the mobile terminal and transmission of the authentication response by the transmitting unit of the mobile terminal to the receiving unit of the technical apparatus.

8. The method as claimed in claim 1, wherein encrypted communication is used for transmission of the reservation request from the transmitting unit of the mobile terminal to the receiving unit of the backend, transmission of the validation request by the transmitting unit of the technical apparatus to the receiving unit of the backend, transmission of the validation response by the transmitting unit of the backend to the receiving unit of the technical apparatus, transmission of the authentication request from the transmitting unit of the technical apparatus to the receiving unit of the mobile terminal and transmission of the authentication response by the transmitting unit of the mobile terminal to the receiving unit of the technical apparatus.

9. The method as claimed in claim 1, wherein
the technical apparatus has a storage device, and
only one data record containing reservation information for one user is stored in the storage unit of the technical apparatus.

10. The method as claimed in claim 1, wherein the technical apparatus and the backend communicate at least one of data relating to status of components of the technical apparatus, a location of the technical apparatus and billing-related data.

11. The method as claimed in claim 1, wherein the technical apparatus is a vehicle, a machine, a building or a room.

12. The method as claimed in claim 1, wherein the technical apparatus is a fleet vehicle.

13. The method as claimed in claim 1, wherein the authentication request and the authentication response are generated after the validation request and the validation response.

14. The method as claimed in claim 1, wherein transmitting the authentication response by the user to the receiving unit of the technical apparatus comprises transmitting a personal identification number (PIN) entered by the user to the receiving unit of the technical apparatus, and when the PIN is authenticated the computer unit of the technical apparatus enables the technical apparatus.

15. A system, comprising:
a technical apparatus having a first receiving unit, a first transmitting unit and a first computer unit;
a backend having a backend receiving unit, a backend transmitting unit and a backend computer unit, and
a mobile device having a second receiving unit, a second transmitting unit and a storage unit, wherein
the second transmitting unit is configured to transmit a reservation request of a user to the backend receiving unit and the reservation request is forwarded to the backend computer unit,
the backend computer unit is configured to check the reservation request in relation to authentication and authorization of the user and availability of the technical apparatus, to generate a data record, the data record containing reservation information and a unique identification feature including information relating to authentication and authorization of the user, to encrypt the data record to produce an encrypted data record, the data record being encrypted with an apparatus-specific password in such a way that the encrypted data record cannot be read and/or decrypted by the mobile terminal, and to forward the encrypted data record to the backend transmitting unit,
the backend transmitting unit is configured to transmit the encrypted data record to the second receiving unit for the encrypted data record to be stored in the storage unit,
the second transmitting unit is configured to transmit the encrypted data record to the first receiving unit and the encrypted data record is forwarded to the first computer unit;
the first computer unit is configured to decrypt and then evaluate the encrypted data record, to generate an authentication request, and to forward the authentication request to the first transmitting unit,
the first transmitting unit is configured to transmit the authentication request to the second receiving unit, and
when an authentication response is transmitted by the user to the first receiving unit, the authentication response is evaluated by the first computer unit, and the first computer unit enables the technical apparatus,
wherein, after the first computer unit decrypts and evaluates the encrypted data record:
the first computer unit generates a validation request to check the unique identification feature contained in the data record and forwards the validation request to the first transmitting unit,
the first transmitting unit transmits the validation request to the backend receiving unit for the backend computer unit to evaluate the validation request,
the backend computer unit generates a validation response and forwards the validation response to the backend transmitting unit, and
the backend transmitting unit transmits the validation response to the first receiving unit and the first computer unit evaluates the validation response.

16. The system as claimed in claim 15, wherein the technical apparatus is a vehicle, a machine, a building or a room.

17. The system as claimed in claim 15, wherein the technical apparatus is a fleet vehicle.

* * * * *